United States Patent [19]

Brand

[11] Patent Number: 4,662,582
[45] Date of Patent: May 5, 1987

[54] LIGHTWEIGHT AIRCRAFT

[76] Inventor: Rolf Brand, 212 N. Mecklenburg Ave., South Hill, Va. 23970

[21] Appl. No.: 681,702

[22] Filed: Dec. 14, 1984

Related U.S. Application Data

[60] Continuation of Ser. No. 545,587, Oct. 26, 1983, abandoned, which is a continuation of Ser. No. 387,541, Jun. 11, 1982, abandoned, which is a division of Ser. No. 213,458, Dec. 5, 1980, Pat. No. 4,382,566.

[51] Int. Cl.⁴ .............................................. B64C 1/16
[52] U.S. Cl. .................................... 244/13; 244/54; 244/55; 244/DIG. 14
[58] Field of Search .................. 244/13, 55, 54, 65, 244/87, DIG. 1, 117 R, 67, 60; 248/554–557; 308/26

[56] References Cited

U.S. PATENT DOCUMENTS

| 899,350 | 9/1908 | Steinhaus | 244/13 |
|---|---|---|---|
| 1,016,929 | 2/1912 | Black | 244/DIG. 1 |
| 1,038,633 | 7/1912 | O'Bryan | 244/13 |
| 1,131,380 | 3/1915 | Herebner et al. | 244/13 |
| 1,158,594 | 11/1915 | Vinfila | 244/87 |
| 2,070,782 | 2/1937 | Cannery | 248/556 |
| 2,166,259 | 7/1939 | Meyer | 308/26 |
| 3,013,749 | 12/1961 | Dunham | 244/65 |
| 4,249,711 | 2/1981 | Godberson | 244/54 |
| 4,262,363 | 4/1981 | Slusarczyk | 244/DIG. 1 |

FOREIGN PATENT DOCUMENTS

| 421136 | 2/1911 | France | 244/DIG. 1 |
|---|---|---|---|
| 422596 | 3/1911 | France | 244/60 |
| 18081 | 2/1914 | France | 244/DIG. 1 |
| 716192 | 12/1931 | France | 244/67 |
| 22750 | of 1912 | United Kingdom | 244/60 |

Primary Examiner—Galen Barefoot

[57] ABSTRACT

In a lightweight aircraft having a principal longitudinal load-carrying member, a wing structure mounted on the load-carrying member, a tail rudder and elevator assembly mounted on the load-carrying member, a propeller mounted on the load-carrying member for rotation about the member's longitudinal center line, an engine mounted on the load-carrying member, and means drivingly connecting the engine to the propeller.

9 Claims, 8 Drawing Figures 4,662,582

LIGHTWEIGHT AIRCRAFT

This application is a continuation of application Ser. No. 545,587, filed Oct. 26, 1983, now abandoned, which was a continuation of application Ser. No. 387,541, filed June 11, 1982, now abandoned, which is a division of application Ser. No. 213,458, filed Dec. 5, 1980, which issued as U.S. Pat. No. 4,382,566 on May 10, 1983.

BACKGROUND OF THE INVENTION

This invention relates to aircraft and more particularly to a lightweight aircraft having a novel propeller assembly.

In the prior art, it has been the conventional practice to mount the propellers on the forward part of the aircraft or on a structure attached to, but separate from, the principal longitudinal load-carrying structural member. Even when building lightweight aircraft, it was still necessary to provide a heavy structure for the prime mover separate from the principal longitudinal member. These designs add weight to the aircraft and are complicated and costly. Thus, lightweight aircraft have been affordable and maintainable by only a limited number of persons.

Accordingly, it is the principal object of the present invention to provide an improved aircraft design.

Another object of the present invention is to provide an improved propeller-driven aircraft.

A further object of the present invention is to provide an improved lightweight aircraft having a novel propeller assembly requiring no additional complex mounting structure.

A still further object of the present invention is to provide an improved aircraft aircraft design that is economical to build and to service.

SUMMARY OF THE INVENTION

Generally, the embodiment of the present invention includes the novel design of a principal load-carrying member on which the wing, tail rudder, and elevator assemblies, propulsion means, and propeller are mounted. The propeller is mounted between the wing and the tail assemblies and rotates about the centerline of that principal load-carrying member.

BRIEF DESCRIPTION OF THE DRAWINGS

Other objects and advantages of the present invention will become more apparent to those persons having ordinary skill in the art to which the present invention pertains from the following description taken in conjunction with the accompanying drawings wherein:

FIG. 4 is an elevational view of a propeller and a propeller driving means utilizing an embodiment of the present invention.

FIG. 5 is a top plan view of the propeller and propeller driving means taken on line 5—5 of FIG. 4.

FIG. 6 is a side-elevational view taken on line 6—6 of FIG. 4.

FIG. 7 is a side partial-sectional view of the novel propeller design shown in FIGS. 4 and 6 showing another embodiment of the invention using a different driving means.

FIG. 8 is another embodiment of the invention shown in FIGS. 4 and 6 using a different bearing means.

DETAILED DESCRIPTION OF THE PREFERRED EMBODIMENT

Figure 1:
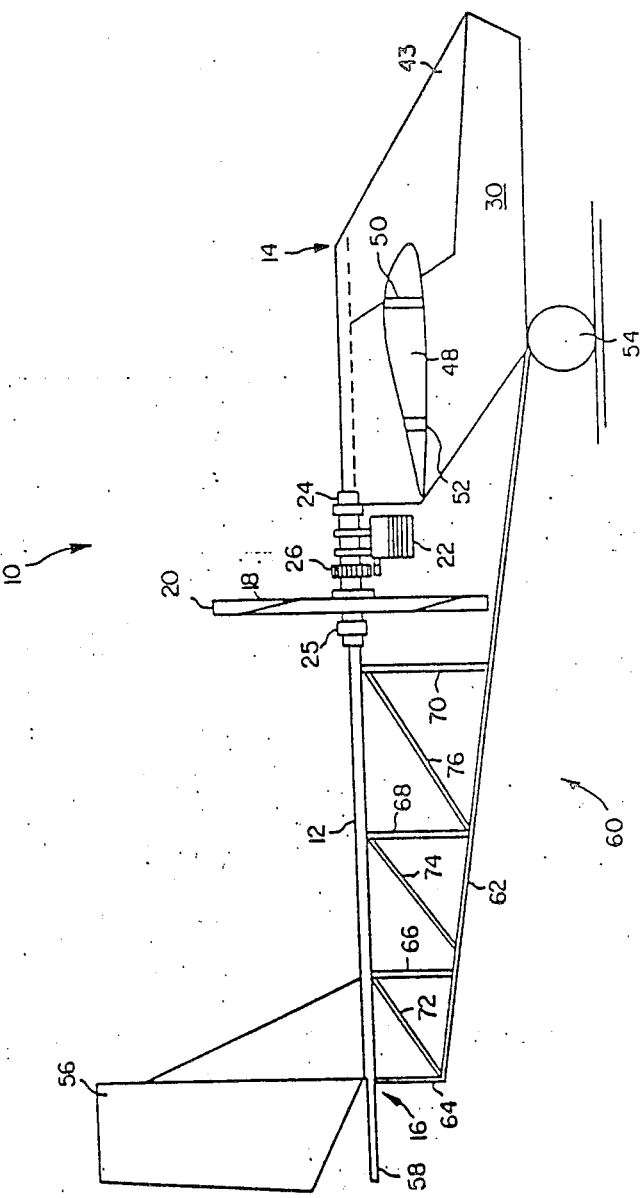
FIG. 1 is a top plan view of a lightweight aircraft showing an embodiment of the present invention.
Figure 2:
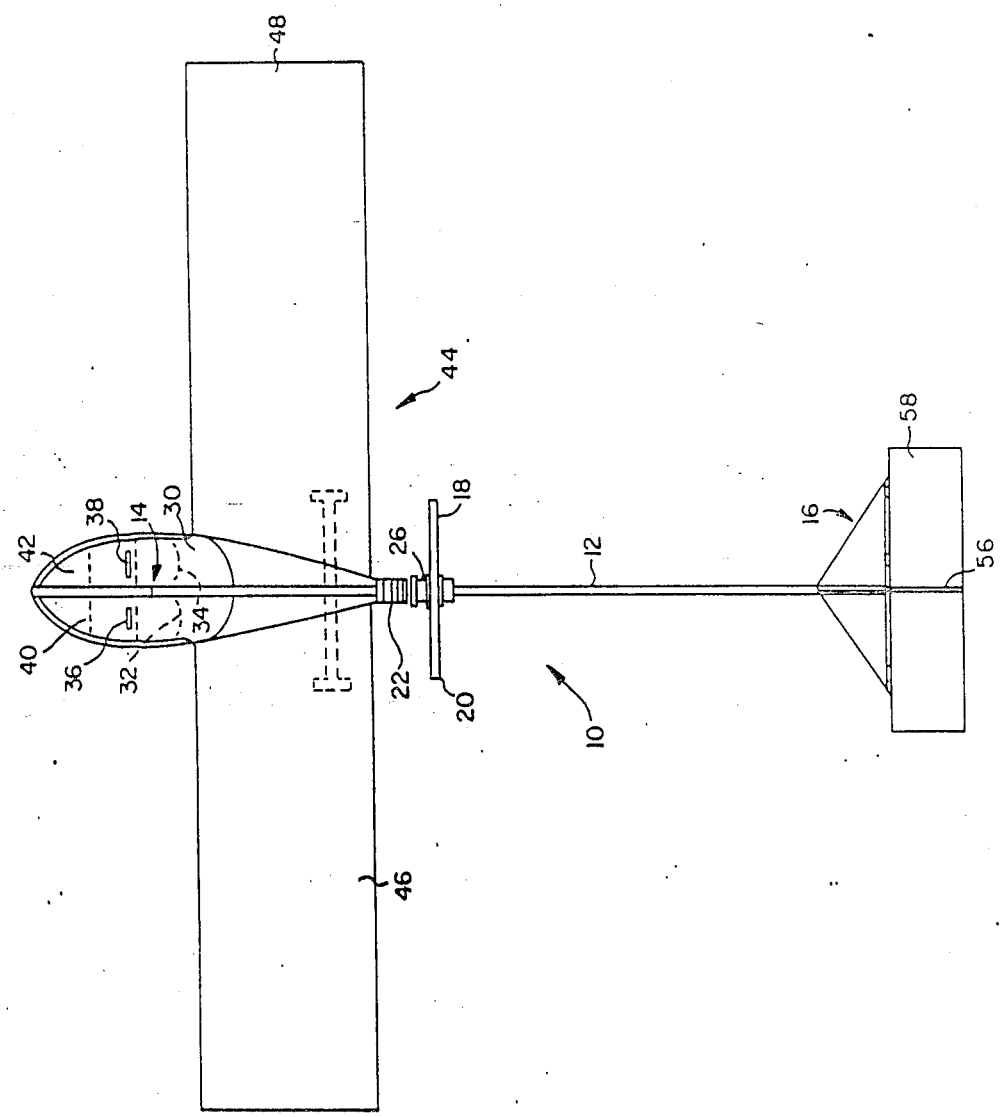
FIG. 2 is a side-elevational view of the aircraft shown in FIG. 1.
Figure 3:
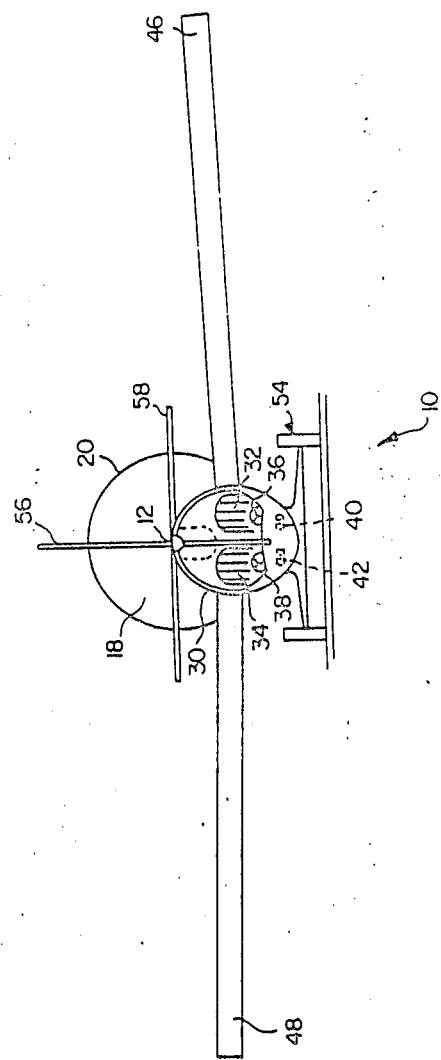
FIG. 3 is a sectional view of the aircraft taken on line 3—3 of FIG. 1.

Referring to FIGS. 1 through 6 of the drawings, there is illustrated a preferred embodiment of the present invention. Generally, this embodiment consists of a lightweight aircraft including a longitudinally-disposed, principal load-carrying structural member 2, wing assembly 4, tail fin 6, rudder 7, and elevator 8 assemblies, propeller 10, rotating means generally indicated at 12, struts 14, wheel structure 16, and an operator's station generally indicated at 18.

The tail assemblies 6 through 8 and the wing assembly 4 are mounted apart from each other on the principal load-carrying member 2. Propeller 10 and rotating means 12 are mounted between them for rotation about the longitudinal centerline of member 2. Struts 14 are also mounted on member 2 from the forward and aft connections of wing assembly 4 and extend generally downwardly. Vertical member 15 is attached to and perpendicular to member 2.

The struts 14 and vertical member 15 at their lower end are connected to the wheel structure 16 which is of conventional design. The operator's station 18 is also attached to the struts 14 but at points above the connection points for the wheel structure 16. The operator's station generally indicated at 18 comprises an operator's seat, a seat belt, and control sticks and pedals connected to control rotating means 12 and the position of the rudder assembly 7 thereby controlling flight characteristics.

The wing assembly 4 is conventional in design and generally consists of sailcloth secured to a frame that is mounted on the principal structural member 2.

The mounting assembly generally indicated at 22 for both the propeller 10 and the rotating means 12 includes a bearing seat 25, inner race 24, vibration dampening material 26, bearing means 28, and an outer race, which is seated in bearing sleeve 30.

The bearing seat 25 about which rotation occurs is mounted on inner race 24 and both are radially disposed about the principal load-carrying member 2.

Inner race 24 has a radially disposed thrust flange 32 and bracket 33. Thrust flange 32 is secured to member 2 to transmit thrust. The vibration dampening material 26 is disposed between bearing seat 25 and member 2 and prevents transmission of vibrations to member 2.

Bearing means 28 in the preferred embodiment comprises ball bearings mounted on bearing seat 24.

The outer race is rotatably mounted on bearing means 28. The rotating sleeve 30 has flange sections 34 and 36; section 36 is positioned aft of section 34. Propeller 2 is secured to flange section 34 through bolts 38 or through equivalent means. Drive belt 40 is reeved about flange section 36.

Rotating means 12 includes engines 42 and drive belt 40. Housings of engines 42 are provided with flanges for mounting on bracket 33. Engines 42 include carburetors 44, exhaust outlets 46 and output shafts 48. Drive pulleys 49 are mounted on and are rotated by output shafts 48. Drive belt 40 is reeved around drive pulleys 49 and flange section 36.

Thus, output of engines 42 is through output shafts 48. The rotating shafts 48 cause drive pulleys 49 and thus belt 40 to turn rotating sleeve 30 through its flange section 34. The propeller 10, which is connected to rotating sleeve 30 by bolts 38, thus rotates about the longitudinal centerline of member 2. Resulting thrust is transmitted to member 2 by thrust flange 32.

Referring to the drawings, FIG. 7 shows another embodiment of the invention in which rotating sleeve 30 has a different construction in that flange section 36 is positioned at the aft end of rotating sleeve 30 instead of in the middle as shown in FIG. 6, and the engines 42 are not mounted on mounting assembly 22, but are mounted on member 2 on a separate assembly.

FIG. 8 shows a third embodiment of the invention in which bearing means 28 comprises split solid bearing consisting of an annular portion 50 and flanged portion 52.

It should also be noted that control cables connecting operator's control station 18 to the stabilizer assembly 8 and engines 42 may pass through the vibration dampening material 26.

Belt drive 40 has been shown to be a belt means, but gear, chain, or other equivalent drive means may be used.

The principal load-carrying member 2 may comprise a tubular aluminum or plastic member. Additional structural reinforcement in member 2 may be provided to handle the flight stresses.

The rotating means in the drawings has been shown to comprise two engines 42, but it should be noted that a single engine or more than two engines may be used in the present invention. In the preferred embodiment the engines may be two-cycle engines.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A light weight aircraft comprising:
 a functionally-continuous, longitudinally-disposed main fuselage structure, a wing structure supported by said fuselage structure,
 a propeller means mounted on said fuselage structure generally aft of said wing structure for concentric rotation about a longitudinal line of said fuselage structure,
 an engine means mounted on and in close proximity of said fuselage structure, a connecting means positioned outside of said fuselage structure, drivingly connecting said engine means to said propeller means,
 an engine direct mounting means positioned on outside of said fuselage structure in close proximity said propeller means for mounting said engine means directly on the outside of a portion of said fuselage structure that carries the engine and propeller means, said engine direct mounting means including a bracket means to which said engine means is attached,
 said engine direct mounting means further including a mounting means for fixedly and directly mounting said bracket means to said fuselage structure,
 said mounting means including a mechanical connection means extending between said bracket means and said fuselage structure for connecting and mechanically engaging and holding said bracket means to said fuselage structure,
 said mechanical connection means comprising a securing member secured to said bracket means and penetrating the surface of and penetrating into said fuselage structure,
 a drive sleeve disposed about said fuselage structure, said propeller means being secured to said drive sleeve,
 a bearing means positioned between said drive sleeve and said fuselage structure, and said connecting means causing said drive sleeve to rotate on said bearing means about said fuselage structure.

2. The lightweight aircraft of claim 1 including, said securing member comprising a bolt.

3. The lightweight aircraft of claim 2 including, said engine means creating general aircraft structural torque forces transmitted to said lightweight aircraft and propeller torque forces transmitted directly to said propeller means, and said engine direct mounting means transmitting all said general aircraft structure and transmitting substantially all of the weight and torsional forces of said engine means directly to said fuselage structure.

4. The lightweight aircraft of claim 1 including, a tail assembly mounted on said fuselage structure aft of said wing structure.

5. The lightweight aircraft of claim 1 including, a bearing seat secured directly to said fuselage structure and on which said bearing means is seated.

6. The lightweight aircraft of claim 1 including, said propelling means comprising the sole propelling means for said lightweight aircraft.

7. The lightweight aircraft of claim 1 including, a pilot support station supported by said fuselage structure.

8. The lightweight aircraft of claim 1 including, said propeller means being attached to said drive sleeve at one end thereof.

9. The lightweight aircraft of claim 8 including, said one end being the aft end thereof.

* * * * *